Sept. 8, 1964    A. E. JENSEN    3,147,764
IRRIGATION APPARATUS
Filed July 25, 1960    3 Sheets-Sheet 1
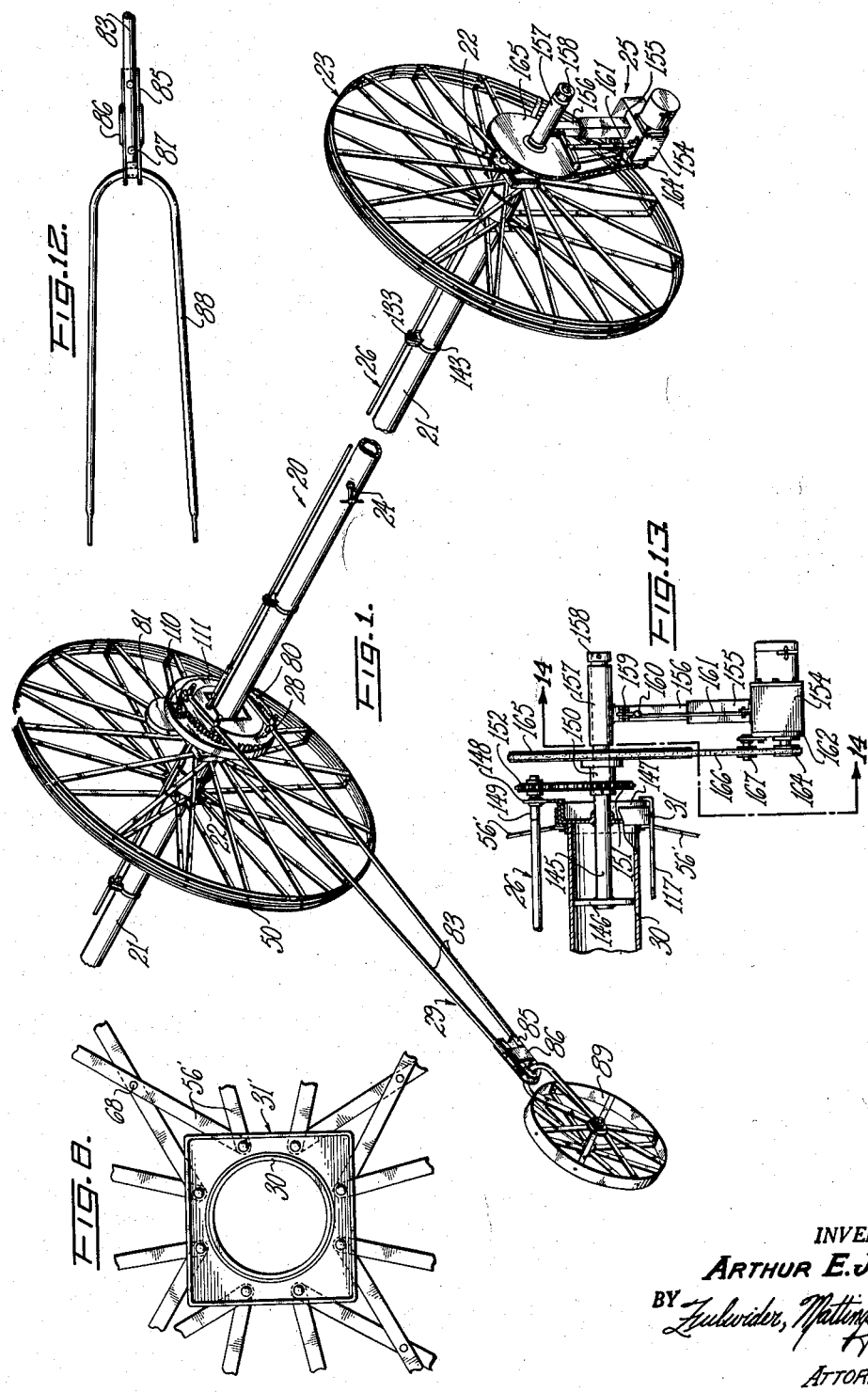
INVENTOR.
ARTHUR E. JENSEN
BY
ATTORNEYS

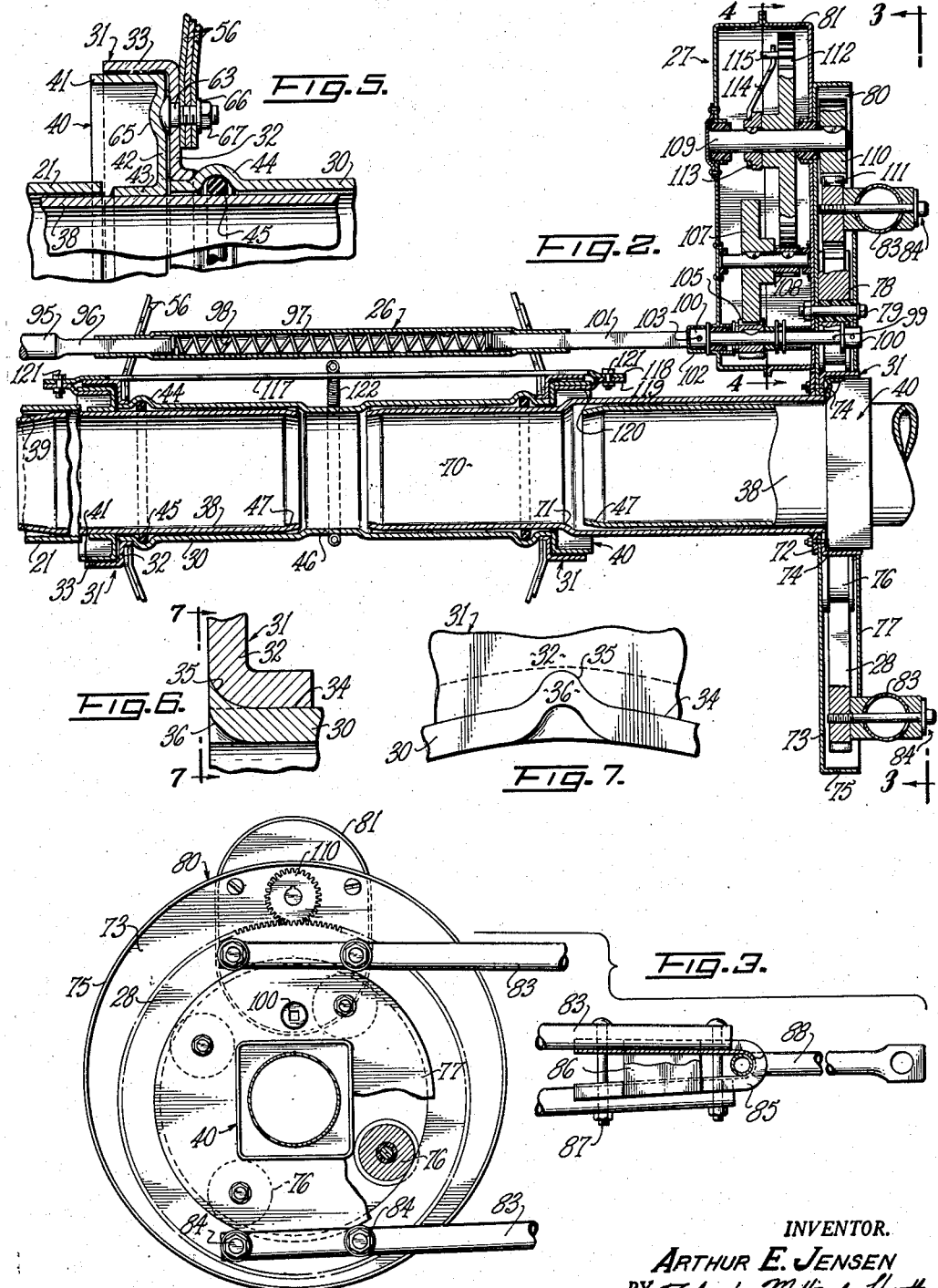

Sept. 8, 1964    A. E. JENSEN    3,147,764
IRRIGATION APPARATUS
Filed July 25, 1960    3 Sheets-Sheet 3
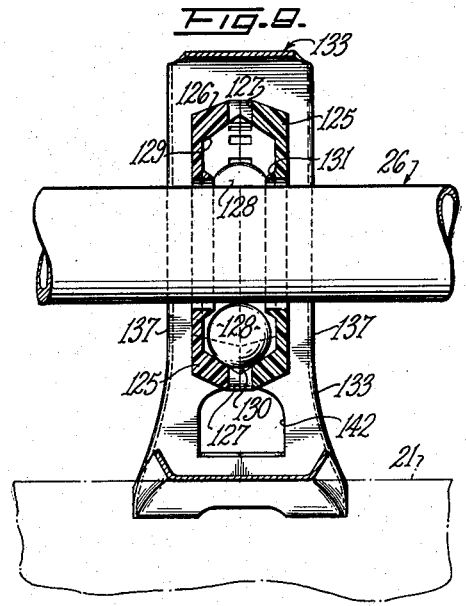
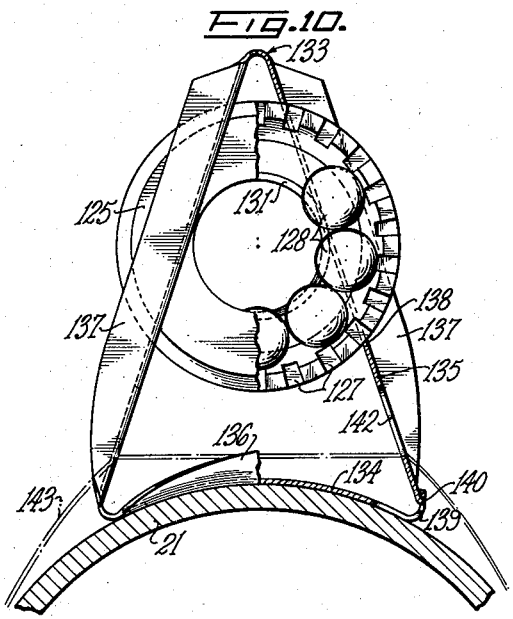
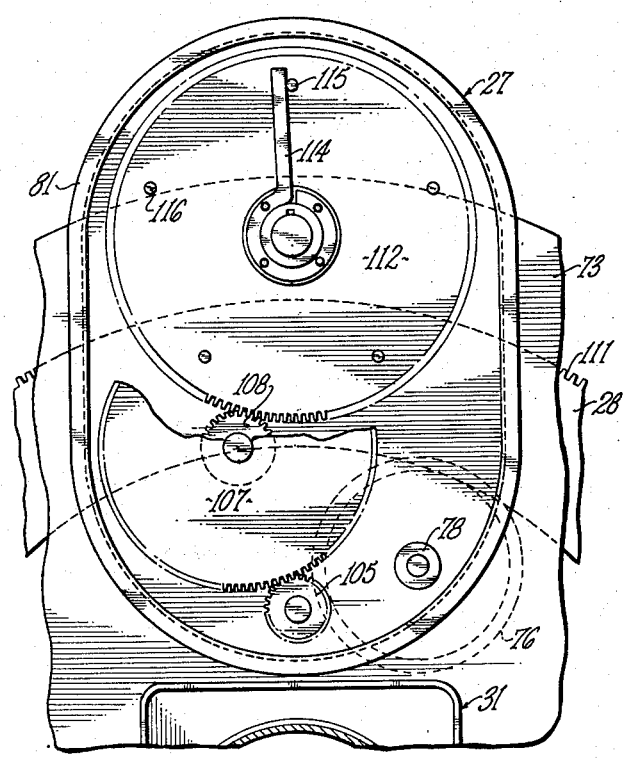
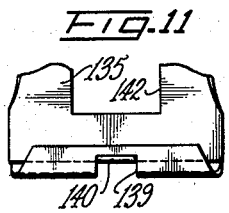
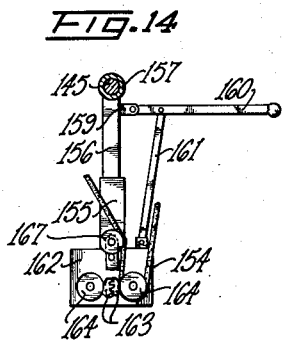
INVENTOR.
ARTHUR E. JENSEN
BY
ATTORNEYS

United States Patent Office

3,147,764
Patented Sept. 8, 1964

3,147,764
IRRIGATION APPARATUS
Arthur E. Jensen, 11372 SW. Skyline Drive, Lemon
Heights, Santa Ana, Calif.
Filed July 25, 1960, Ser. No. 45,103
18 Claims. (Cl. 137—344)

The present invention relates generally to irrigation apparatus and, more specifically, to a wheel supported string of irrigation pipe that is movable from place to place in the field under irrigation.

A variety of wheel-supported irrigation pipe lines have recently come into use. Commonly—such apparatus comprises a plurality of sections of pipe which are rigidly interconnected for co-rotation, as by welding for example, into a string which may be as long as a quarter mile. A plurality of wheels are then coaxially rigidly affixed at spaced apart points along the string. At about the center of the string a cart is connected to trail behind the string and mounts a prime mover drivingly connected to the pipe at about the mid point of the string for rotating the pipe in order to turn the wheels and thereby move the string to a new position in a field.

In apparatus of the type just described, the irrigation pipe must be very heavy since it must not only support the water load, but must also be capable of transmitting torque from the central power unit throughout the length of the long string of pipe for turning all of the wheels of the apparatus. In addition, because of the weight of the pipe and because of the manner in which the torque is transmitted to the wheels, the wheels must also be of a relatively heavy construction. Because of the weight of the pipe and the weight of the wheels, a relatively heavy duty prime mover must be employed to move the pipe line. Because of these factors, an apparatus of the type just described assumes a bow-like configuration wherein the opposite ends of the apparatus trail behind the mid portion at which the prime mover is connected. This is primarily due to the inefficiency of the manner of transmission of torque to the wheels most remote from the prime mover. In the operation of such apparatus, it will be observed that the wheels most remote from the power unit are dragged as much as they are rolled over the ground. This is a reflection of very great torsional and bending stresses to which the pipe is subjected and frequently leads to breaking of the pipe.

The bow-like configuration assumed by such apparatus also has the disadvantage of disposing the several sprinkler heads of the pipe at different inclinations when the pipe line comes to rest. Thus, the sprinkler heads near the center of the string of pipe may be disposed in the desired vertically upwardly extended position, while sprinkler heads at the opposite ends of the string of pipe may be pointing downwardly. It is then necessary to manually move the portions of the string of pipe having the downwardly pointing sprinkler heads in order to move the sprinklers to the desired erect position.

Many of the foregoing disadvantages have been substantially eliminated by the irrigation apparatus shown in my co-pending application, Serial No. 669,322, filed July 11, 1957, now issued as United States Patent No. 2,946,515. It is among the objects of this invention to improve upon the irrigation apparatus shown in my co-pending patent application and, particularly, to increase the efficiency of operation of my irrigation apparatus when operating over highly irregular terrain or in a field having deep row crops.

Another important object of my invention is to provide a wheel supported irrigation pipe apparatus having a plurality of power transmission units spaced therealong but actuated by a single prime mover through a single drive shaft, with the power transmission units incorporating means for simultaneously actuating all of the power units to prevent transmission of excessive torsional stresses to the irrigation pipe. With this arrangement, no "wrapping" occurs in the pipe sections, all sections of the long string of pipe commence movement simultaneously and move at the same rate over level or irregular terrain, and the string of pipe can be brought to a halt with all of the sprinkler heads in substantially erect position.

Another object of the invention is to provide a simplified construction for the plurality of identical power transmission units that are spaced along the string.

It is also an object of the invention to provide an improved means of mounting the common power source for all of the power transmission units on one end of the wheel supported string of irrigation pipe, comprising a portable quickly attachable and detachable unit incorporating a clutch as well as a means for very simply reversing the direction of movement of the pipe line.

The invention also has for an object the provision of a strong but light weight wheel supported irrigation apparatus, whereby the power requirements for moving the apparatus are greatly reduced.

These and other objects and inventions of my invention will be apparent from the following description when taken in conjunction with the annexed drawings wherein:

FIGURE 1 is a partial perspective view of the improved wheel supported irrigation pipe line;

FIGURE 2 is a partial sectional view taken along the axis of the pipe line and extending through one of the power transmission units and through an adjacent wheel;

FIGURE 3 is an elevational view taken along the line 3—3 of FIGURE 2;

FIGURE 4 is a vertical sectional view taken on the line 4—4 of FIGURE 2;

FIGURE 5 is a partial sectional view illustrating details of the pipe coupler means in conjunction with the wheel hub construction;

FIGURE 6 is a partial sectional view illustrating one manner of drivably interconnecting a tubular hub section and a portion of the coupler means;

FIGURE 7 is a partial elevational view taken in the direction of the line 10—10 of FIGURE 9;

FIGURE 8 is a partial elevational view looking at one end of the hub assembly and showing the spoke arrangement of the wheels illustrated in FIGURE 1;

FIGURE 9 is a sectional view taken along an axial plane of my improved drive shaft bearing means and the supporting brackets therefor;

FIGURE 10 is a side elevational view of the bearing means shown in FIGURE 9, portions thereof being cut away to show details of interior construction;

FIGURE 11 is a fragmentary elevational view of a portion of the bracket shown in FIGURES 9 and 10, and particularly illustrating the means of interconnecting the opposite ends of the one piece material from which the bracket is fabricated;

FIGURE 12 is a top plan view of a tail wheel yoke for one of the power transmission units, also showing portions of the rods interconnecting the tail wheel yoke to the power transmission unit;

FIGURE 13 is an elevational view of the mounting means for the prime mover, portions of the adjacent pipe end being cut away to show interior details of construction; and FIGURE 14 is a view taken on the line 14—14 of FIGURE 13.

Referring now to the drawings for the general arrangement of the invention, and referring particularly to FIGURE 1, the apparatus includes a string 20 of sections of irrigation pipe 21. Although FIGURE 1 shows only portions of two pipe sections 21, it will be appreciated that the string 20 may be as long as a quarter of a mile. The sections of the pipe 21 are usually thirty or forty feet long and are connected in fluid communication with the adjacent pipe sections by a coupling means 22 which also serves as the hub of a wheel 23. Thus, each section of pipe 21 is supported at opposite ends by a pair of the wheels 23 and the assembled string 20, coupling means 22 and wheels 23 are adapted for co-rotation. One or more sprinklers 24 is usually secured to each pipe section 21.

A power source 25 is detachably connected to one end of the string 20 for selectively supplying either clockwise or counterclockwise torque to one end of a rotatably mounted drive shaft assembly 26 that extends in parallel relation along the string 20, to which the drive shaft assembly is affixed. A plurality of power transmission units 27 are mounted on the string 20 at spaced intervals therealong, preferably adjacent to and in driving engagement with one of the wheels 23. It is to be understood that normally there are fewer power transmission units 27 than there are wheels 23, three or four such units normally sufficing for a quarter mile string 20. Each of the units 27 includes an annular member 28 that is normally held rotationally immobile by a means 29 and the units 27 are adapted to translate the torque of the drive shaft assembly 26 into rotation of the wheels 23 and string 20 in reaction to the rotational immobility of the annular member 28.

The drive shaft assembly 26 extends from the power source 25 along the string 20 to the power transmission unit 27 most remote from the power source. When the power source 25 is energized, the unit 27 most remote from the power source is immediately in direct driving enagagement with the drive shaft assembly. However, the string 20 is not yet impelled into movement because the inertia of the entire string prevents the transmission of torque through the most remote unit 27 until all of the "wrap" of the drive shaft assembly 26 has been taken up between the most remote unit 27 and the power source 25. Each of the units 27 between the most remote unit and the power source 25 is provided with a preferably adjustable means to bring all of the units 27 into direct driving engagement with the drive shaft assembly 26 at the same time. Thus, all of the wheels 23 are simultaneously urged into movement at the same rate across the terrain without inducing any excessive torsional stresses in the sections of pipe 21.

More specifically, the ends of a pair of pipes 20 are coupled to the hub of a wheel in the manner best seen in FIGURE 2. Each wheel has a tubular hub 30 made from a relatively short section of pipe of the same diameter as the pipe 21. At the extreme opposite ends, the hub 30 exteriorly mounts a pair of female coupling members 31. As is shown, the female members 31 preferably comprise a one piece member including a floor or base portion 32 disposed radially of the hub 30 and surrounded by a continuous square wall portion 33, the wall extending axially outwardly beyond the end of the hub 30. The floor portion 32 is formed with a central opening 34 adapted to slip over the end of the hub 30 and formed with at least one notch 35 to receive a complementary dimple 36 pressed in the end of the hub 30 (see FIGURES 6 and 7). The hub 30 and female members 31 are thereby coupled together for co-rotation.

Both ends of the pipe 21 internally telescopically receive one end of a short tubular coupler section 38. One end 39 of the coupler section 38 is formed with a taper for insertion into the end of the pipe 21 and the coupler section 38 has an external diameter adapted for a press fit in the pipe to achieve co-rotation of the coupler section and pipe. At about its mid portion, each coupler section 38 exteriorly mounts a male coupling member 40 that is complementarily matingly receivable in the female member 31 at one end of the hub 30. The male member 40 is also provided with a continuous wall 41 receivable within the wall 33 of the female member 31. A base or floor section 42 of the male member 40 has a central opening defined by a cylindrical flange 43 which receives the coupler section 38 and is secured thereto by welding or other suitable fastening means.

The other end of each coupler section 38 is slidably receivable within an end of the hub 30. In order to provide a fluid seal between the exterior of the coupler section 38 and the interior of the hub 30, the hub has a pair of circumferentially extending grooves 44 formed immediately inwardly of one of the female members 31 for the reception of an O-ring seal 45. The mid portion of the hub 30 is of reduced diameter, as indicated at 46 and the corresponding ends of the coupler sections 38 are flared inwardly as indicated at 47, for easy entry into the hub, to the extent permitted by the internal shoulder of an end of the mid-portion 46, or by enaggement of the coupling members.

The wheel 23 has a rim consisting of two substantially semi-circular sections 50, having the cross sectional configuration shown in FIGURE 7. It will be understood that each of these sections exceeds 180° in length and has its ends overlapping the ends of the other section to define a complete circle. As will be apparent to those skilled in the art, the extent of overlap should be sufficient to prevent buckling of the assembled rim.

The manner of securing the spokes to the female member 31 can best be seen in FIGURE 5. In this figure the plane of the section is taken diagonally through the corners defined by the continuous wall 33. It will be understood that the corner shown in FIGURE 5 is typical of the other three corners of the member 31. Thus in each corner an opening 63 is formed in the base or floor portion 32 of the member 31, the opening preferably being square to receive the square shank portion of a carriage bolt 64. The head of the carriage bolt 64 is disposed within the female member 31 and in order to permit a closer engagement of the male member 40 with the female member the floor portion 42 of the male member is provided with suitably located dimples 65. The bolt 64 extends axially inwardly of the hub 30 and passes through suitable openings formed in the lower ends of a plurality of the spokes 56, which are secured in place under a suitable washer 66 and nut 67. The nut 67 is fastened securely before the bolts 60 securing the outer ends of the spokes 56 are snugged up.

Crossing spokes are secured together by a rivet 68.

A means similar to the coupler section 38 is provided for mounting each of the power transmission units 27 immediately adjacent and in driving engagement with a hub 30 of selected ones of the wheels 23 or 23' as the case may be. As is shown in FIGURE 2, this means includes a mounting tube 70, made of a relatively short section of pipe having one end portion adapted to be telescopically slidably received within an end of a hub 30. The mounting tube 70 has an expanded end portion, protruding outwardly from the hub 30, and defining a circumferentially extending shoulder 71 on the tube. One of the male coupling members 40 is rigidly secured to the mounting tube 70 immediately inwardly of the shoulder 71 for mating reception within the corresponding female member 31.

At its outer end the mounting tube 70 has an exterior plate 72 rigidly secured thereto for mounting a housing 73 and one of the female members 31 by a plurality of fastener means 74, these fastener means corresponding to those illustrated in FIGURE 5, and it further being understood that they are located at the corners of the member. Another coupler section 38 is then slipped into the expanded end of the mounting tube 70 until the coupler section's male member 40 is matingly engaged with the female member 31 of the mounting tube 70, and the portion of the coupler section 38 extending outwardly from the male member 40 supports another section 21 of irrigation pipe.

As is shown in FIGURE 3, the housing 73 is a relatively large round plate having an eccentrically located central opening whereby the housing is disposed eccentrically with respect to the axis of the string 20. This housing has a cylindrical peripheral wall 75 within which the annular member 28 is disposed concentrically with the axis of the string 20. In order to support the annular member 28 for relative angular movement of the annular member and the balance of the power transmission unit 27, the housing 73 has a plurality of equally circularly spaced apart peripherally grooved rollers 76 in rolling engagement with the inner face of the annular member 28. To protect the bearing contact of the rollers 76 and annular member 28 against dirt, an annular cover plate 77 is mounted around the open end of the housing 73, being held in spaced relationship to the floor of the housing by a plurality of tubular spacers 78 fixed to the housing by fastener means 79. It will be understood that the cover plate 77 is co-rotational with the housing 73 while the annular member 28 is held rotationally immobile by the means 29.

Due to the eccentricity of the housing 73, a crescent shaped clearance space 80 is defined between the periphery of the annular member 28 and the housing wall 75. At about the center of this clearance space, a gear box housing 81 is mounted on the side of the housing 73 opposite the annular member 28. The drive shaft assembly 26 passes through the radially innermost end of the gear box 81 and transmits torque through a gear train in the gear box housing which then moves planetarily around the axs of the string 20, in reaction to the rotational immobility of the annular member 28. This causes turning of the housing 73 which thus serves as a drive member to transmit torque to the interconnected pipe sections 21.

The means 29 for holding the annular member 28 includes a pair of angularly related elongated rods 83 having their forward ends secured to diametrically opposite positions on the annular member by a plurality of fastener means 84. At the rear end of the rods 83 they are rigidly fastened together in a substantially U-shaped channel member 85, the rod ends resting within the channels. The legs of the channel member 85 are rigidly interconnected by a pair of opposite side plates 86, welded to the member and a pair of fastener means 87 rigidly interconnect the member 85 and the rods 83. The center section of a yoke 88 passes through the channel member 85, being welded to the closed end of the channel member and a tail wheel 89 is mounted between the ends of the opposite arms of the yoke 88.

Referring now to FIGURE 2 the drive shaft assembly 26 includes relatively long sections of cylindrical tubing or rod 95 having squared ends 96. These ends are receivable within complementarily shaped opposite ends of a drive shaft coupler tube 97, containing a spring means 98 for biasing the connected drive shaft sections of tube 95 in axially opposite directions. Within the gear box 81, the drive shaft assembly 26 includes a rotatably mounted shaft 99 having its opposite ends formed with square heads 100. At each end of the portion of the drive shaft assembly between a pair of gear boxes 81, a square shaft 101 is slipped into the adjacent squared end of the coupler 97 and at its exposed end has a square socket portion 102 matingly receiving a squared head 100, the two being interconnected by a pin 103 or other suitable fastening means.

The gear box 81 encloses a reduction gear train including a small pinion 105 drivably keyed to the shaft 99. Another shaft 106 is journaled in the box 81 and coaxially drivably supports, in stepped relation, a larger spur gear 107 in drivable engagement with the pinion 105, and another pinion 108.

Above the shaft 106 the gear box 81 journals a countershaft 109 having one end protruding out of the gear box and into the mid portion of the crescent shaped clearance space 80. The exposed end of the countershaft 109 has a pinion 110 keyed thereto in drivable engagement with external gear teeth 111 formed on the annular member 28. Within the gear box 81, the countershaft 109 rotatably mounts a relatively large spur gear 112 in drivable engagement with the pinion 108. Immediately adjacent the gear 112 a collar 113 is drivably keyed to the countershaft 109 and has a rigid radially extending arm 114 whose outer end is adapted to intercept the circular path of a crank pin 115 that is carried by the spur gear 112.

The gear box construction just described is applicable to all of the units 27 except the one which is located most remotely from the power source 25. In the most remote unit 27 the collar 113 and arm 114 and crank pin 115 are eliminated and the spur gear 112 is drivingly keyed to the countershaft 109 so that an immediate direct drive relationship is established between the drive shaft 26 and the pinion 110. All of the other units 27 have the gear train construction including the lost motion means just described, each of the lost motion means being differently adjusted. With this arrangement substantially all of the wrap of the drive shaft assembly 26 is taken up before a direct driving relationship occurs between the drive shaft assembly 26 and all of the pinions 110. Thus, all of the supporting wheels for the string 20 commence rotation simultaneously and are moved at the same rate whereby differential torsional stresses are prevented in the pipe sections 21.

Referring to FIGURE 4, it will be noted that one face of the spur gear 112 is provided with a plurality of equally circularly spaced apart blind bores 116 each of which is adapted to securely seat the crank pin 115. In each unit 27, the position of the crank pin 115 is determined by the remoteness of the unit from the power source 25. Thus, assuming the unit 27 shown in FIGURE 4 to be the second most remote, with the crank pin 115 in the position shown, the crank pin 115 of the third most remote unit, on substantially level terrain and in a quarter mile string, would be positioned approximately 135° in a counterclockwise direction. It is to be understood, however, that the angular spacing between successive crank pins 115 of successive units 27 is variable within a relatively large range and is dictated by local considerations such as the length of the string being moved, the levelness or irregularity of the terrain or combinations of such factors. In any event, it will be understood that when the drive shaft assembly 26 is actuated, the most remote pinion 110 is in immediate direct driving engagement with the annular member 28. However, the remote end of the string 20 does not yet commence movement due to the inertia of the entire string resisting rolling movement until such time as the wrap is taken up in the drive shaft assembly. As is apparent, the torsional stress at any particular point along the length of the drive shaft assembly 26 is primarily dictated by its spacing relative to the most remote unit 27. Accordingly, the crank pin 115 of each unit 27 is placed within a selected one of the bores 116 so as to be in a position corresponding to the angular strain of the drive shaft assembly 26 at the corresponding position along the length of the drive shaft assembly.

In FIGURE 2, the parts of the string 20 are shown in coaxial position, as they would be on level terrain. However, on uneven terrain the section of pipe 21 at the left end of the illustrated hub 30 may be disposed with its axis angularly related to the axis of the pipe section 21 connected to the right hand end of the assembly. FIGURE 2 shows an arrangement for interlocking the coupled members 31 and 40 at the opposite ends of the hub to insure the integrity of the assembly whether or not the string 20 is being moved over even or uneven ground.

This interlocking means includes an elongated band 117, longer than the hub assembly and having offset end portions 118, extending beyond the couplers at the opposite ends of the hub assembly. A clamping arm 119 is provided for each end of the band 117 that is formed with a bore alignable with a bore formed in the corresponding offset end 118. The clamping arm 119, in turn, has an offset portion 120 engageable beneath one side wall of the male coupler 40. The clamping arms 119 are secured in place by a suitable fastening means 121. A spring 122 may be tied around the hub 30 at the reduced mid portion 46 and around the band 117, to more securely hold the band against displacement.

Referring to FIGURE 1 and assuming the pinion 110 to be rotating in a clockwise direction, the means 29 is biased in counterclockwise direction so that the tail wheel 89 bears against the ground. The annular member 28 is thus held against rotation so that the pinion 110 moves planetarily in clockwise direction around the annular element. The drive shaft assembly 26, as a whole, also moves planetarily in clockwise direction as does the gear box 81. The wheels 23 and string 20 are thus rotated about the axis of the string 20.

Assuming the apparatus to be in the position shown in FIGURE 1 but with the pinion 110 being rotated in counterclockwise direction, the pipe line will not move until the means 29 has been moved in a clockwise direction to extend in the opposite direction relative to the pipe line. Since the inertia of the string 20 exceeds the inertia of the means 29, the counterclockwise rotation of the pinion 110 causes rotation of the annular member 28 through approximately 180° thus carrying the means 29 up and over the string 20 until the tail wheel 89 contacts the ground on the opposite side of the string. The tail wheel 89 now being biased against the ground, the pinion 110 continues its counterclockwise rotation but is now urged into planetary revolution in counterclockwise direction around the rotationally immobile annular member 28. The direction of movement of the string 20 is thus reversed.

The drive shaft assembly 26 is supported on the string 20 by a plurality of bearing means, best seen in FIGURES 9 through 11. It will be appreciated that because of field conditions the bearing supports must be adapted to rotatably support the drive shaft assembly without malfunctioning because of dust, sand or moisture. It will also be appreciated that in a long string of pipe well over 100 bearing supports must be utilized to support the drive shaft assembly 26 in a manner to avoid whipping of the drive shaft. Accordingly, I have devised a vastly simplified and economical bearing means which gives a very long service life and is self cleaning, advantage being taken of the planetary movement of the bearing means and drive shaft assembly to augment the self cleaning feature.

The bearing means includes a pair of identical annular members 125 preferably made of a hard plastic material such as nylon. Each member 125 has a radially outermost wall 126 whose edge is crenelated, being formed with a plurality of equally circularly spaced apart notches 127. When the two members 125 are put together, the notches 127 of both members are preferably placed in registration with one another so as to provide exit passages for foreign matter extending radially outwardly from the race for a plurality of bearing balls 128.

The inner surfaces 129 of the walls 125 are angularly related to each other and together define the outer race for the balls 128. Referring to FIGURE 9, it will be noted that the angle included by the pair of inner surfaces 129 and the diameter of the balls 128 is calculated to achieve tangential contact of the balls with the race along circular traces spaced apart from the notches 127. A clearance space 130 is thus provided between the apex of the angle included between the inner surfaces 129 and the adjacent surfaces of the balls 128.

It is preferable to give the balls 128 a degree of freedom for movement circumferentially in the race so that such movement tends to displace dirt in the space 130 outwardly through the notches 127. Therefore, in the particular bearing shown in the drawings, the race has a circumferential length having a capacity of nine balls, but only eight balls 128 are employed. Thus, when the drive shaft assembly 26 is rotated, the balls 128 can "bounce" in circumferential directions to eject abrasive dust and sand out through the notches 127. With this arrangement, the use of plastic balls in a plastic race becomes feasible, the self cleaning feature giving a very long service life.

The bearing means does not have any inner race, the balls 128 having direct rolling contact with the surface of the drive shaft assembly 26. In order to retain the balls 128 in place during assembly, each member 125 is provided with a radially innermost wall 131, of a diameter to freely pass the drive shaft assembly therethrough. When seated on the outer race, the balls 128 project radially inwardly beyond the radially inner wall 131 to have rolling contact with the drive shaft assembly 26.

The two annular members 125 are held in assembled relationship by a bracket 133 that is made of a single piece of material, preferably sheet metal. As is shown in FIGURE 10, the bracket 133 is substantially triangular in configuration having an arcuate base leg 134 and an identical pair of legs 135. The base leg 134 is contoured for seating on the exterior of a pipe section 21 and has opposite side flanges 136 formed integrally to reinforce the base leg. The side legs 135 are similarly reinforced, each having a pair of opposite edge integral flanges 137.

Each of the pair of identical legs 135, in its web portion, is formed with an opening 138 having an edge profile complementary to the assembled profile of the two members 125. In assembling the bearing one of the members 125 first has the balls 128 placed therein after which the other member 125 is mounted over the balls then, while the two members 125 are held together in concentric relationship they are passed through the opening 138 of one of the legs 135. Thereafter the other leg 135 is bent from an original position substantially coplanar with the other identical leg into the angularly related position shown in FIGURE 10. The opening 138 of the latter leg then receives the other or opposite side of the two members 125. Thereafter the base leg 134 is bent to the final position shown in FIGURE 10. The base leg 134 at its free end is formed with a notch 139 to receive a tongue 140 formed in the free end of the adjacent leg 135, whereby the bracket is held in the triangular configuration shown.

The pair of identical legs 135 are also formed with aligned openings 142 through which a strap 143 can be passed for securing the bearing onto a section of pipe 21.

It will be observed from FIGURE 10 that almost none of the notches 127 is covered by any portion of the bracket 133. It will be recalled that the brackets 133 undergo planetary movement around the axis of the string 20 during movement of the string. Therefore, since the notches 127 are equally spaced entirely around the circumference of the members 125, there will always be some of these notches disposed to provide gravitational escape passages for dirt caught within the member 125. Furthermore, since the drive shaft assembly 26 is, of course, rotating during phases of movement of the pipe line, the balls 128 because of their circumferential degree of freedom having a bouncing action to aid in ejecting dirt from the bearing.

The power source 25 is mounted on an end of the string 20 in the manner best seen in FIGURE 13. The mounting means for the power source includes a shaft 145 that has a plate 146 affixed to one end, the plate being adapted for insertion into the hub 30 of the end most wheel 23. Spaced apart from the plate 146, the shaft 145 has a male coupling member 147 rigidly affixed thereto as by welding that is adapted for mating engagement with the female member 31 on the end of the hub 30. The shaft 145 is thus co-rotatable with the hub 30 when the string 20 is moved.

A bracket 148 is rigidly affixed to a wall of the male member 147 to rotatably support a stub shaft 149 that is drivingly engageable with and end of the drive shaft assembly 26. A collar 150 is rotatably mounted on the shaft 145 and drivably mounts a sprocket 151 in alignment with a sprocket 152 drivably connected to the stub shaft 149, the sprockets being drivably interconnected by a sprocket chain 153.

The power source preferably comprises a small gasoline engine which, in view of the comparative lightness of my wheel move irrigation apparatus, can have less than two horsepower for a quarter mile line, as compared with more than twice this output for conventional wheel move lines. It will be appreciated that other types of prime mover can be employed but in the drawings there is shown an engine 154 secured to the lower end of a tubular member 155 which, in turn, telescopically slidably receives a member 156. The upper end of this latter member is rigidly secured to a sleeve 157 rotatable on the outer end of the shaft 145. A collar 158 or the like is secured to the extreme outer end of the shaft 145 to hold the sleeve 157 in place.

The upper member 156 mounts a bracket 159 to which one end of a lever 160 is pivotally secured. A link 161 is pivotally interconnected at its opposite ends to a mid portion of the lever 160 and the engine 154.

Referring now to FIGURE 14, a gear box 62 is mounted on one side of the engine 154 and has a meshing pair of spur gears 163 one of which is coaxially drivably engaged by the output shaft of the engine. Each of these gears coaxially mounts a drive pulley 164, both of which are in alignment with a large pulley 165 coaxially mounted on the shaft 145 for driving the sprocket 151 through the collar 150. An endless pulley belt 166 is provided for selectively drivably interconnecting one of the pulleys 164 and the pulley 165. An idler 167 is mounted on the gear box 162 in alignment with the pulleys 164 and 165.

As will be apparent, the lever 160 serves as a clutch actuator so that when the lever is lifted the engine 154 is also lifted to release the belt 166 from drivable engagement with either one of the pulleys 164. The belt 166 can then be shifted to the other oppositely rotating pulley 164 whereby the direction of rotation of the drive shaft assembly 26 is reversed, after the lever 160 has once again been lowered.

It will be apparent that in carrying out the invention a great many variations from the specific details of constructions herein above set forth are possible. Accordingly, it is to be understood that I do not mean to be limited to such details, but only by the spirit and scope of the following claims.

I claim:

1. Irrigation apparatus comprising: a plurality of sections of pipe; coupling means interconnecting said sections of pipe in end to end fluid communicating relationship and serving as a wheel hub; a plurality of wheels mounted coaxially with said pipe with said coupling means as a hub, said coupling means serving to rigidly interconnect said pipe and said wheels for rotation as a unit of said wheels, said coupling means and said pipe; an elongated drive shaft; a plurality of supports affixed at spaced apart positions to said sections of pipe for co-rotational movement with said pipe and adapted to provide rotational bearing support for said drive shaft; an annular member rotatably mounted coaxially with said pipe; a means connected to said annular member to hold said member rotationally immobile during rotation of said pipe, said coupling means and said wheels; and a means drivingly interconnecting said drive shaft and said annular member to translate rotation of said drive shaft into rotation of said pipe, said coupling means, said wheels and said supports and into planetary revolution of said drive shaft around the axis of said pipe in response to said rotational immobility of said annular member, whereby said apparatus rolls over a ground surface as a unit.

2. An irrigation apparatus as set forth in claim 1 in which said apparatus includes a plurality of said annular members, means to hold said members immobile, and means to drivingly interconnect said drive shaft to each of said members, and in which a lost motion means is interposed between some of said annular members and said drive shaft, in drivable relation to said means interconnecting said drive shaft and said annular members.

3. Irrigation apparatus as set forth in claim 1 in which said means interconnecting said drive shaft and said annular member comprises a gear train assembly supported on said coupling means for planetary revolution around the axis of said pipe and including a ring gear formed in said rotationally immobile annular member.

4. Irrigation apparatus as set forth in claim 1 in which said coupling means comprises a tubular hub for said wheel that has a pair of coaxial opposite end exterior fittings matingly engageable with a pair of complementary fittings exteriorly affixed on adjacent ends of a pair of said sections of pipe, said pairs of fittings being drivingly interconnected for co-rotation, said tubular hub interiorly mounting a pair of seal means at axially opposite ends of said hub in fluid sealing engagement with the exterior of a pair of pipe ends telescopically received within said hub.

5. Irrigation apparatus as set forth in claim 1 in which said wheel includes a rim consisting of a plurality of interconnected rim sections and a tubular hub comprising a portion of said coupling means, said hub having a coaxial pair of opposite end members, extending radially outwardly from said hub, said rim and said end members being interconnected by a plurality of spokes on axially opposite sides of said wheel, and each of said end members having a plurality of positions, each of which positions is a terminal connection for a plurality of said spokes.

6. Irrigation apparatus as set forth in claim 1 in which each of said supporters for said drive shaft comprises a race housing an incomplete set of bearings and means clamping said race to said pipe, said race being formed throughout its circumference with a plurality of passages for draining water and foreign particles from said race during revolution of said race around the axis of said pipe.

7. Irrigation apparatus comprising: a string of pipe; a plurality of coaxial spaced apart wheels coaxially mounted on said pipe to movably support said string of pipe; a plurality of spaced apart power transmission units mounted on said string of pipe for rolling said string of pipe from place to place; and an elongated rotatable drive shaft mounted along said string of pipe and adapted for transmitting torque to each of said units from a prime mover rotatably driving said shaft, at least some of said units and said drive shaft being drivingly engaged through a lost motion means arranged actuate all of said units after said drive shaft has been torsionally strained throughout its length between said prime mover and the one of said units most remote from said prime mover.

8. Irrigation apparatus comprising: a string of pipe; a plurality of coaxially, spaced apart wheels coaxially drivingly affixed to said pipe to rolling support said string of pipe; a plurality of spaced apart annular members coaxially rotatably mounted on said pipe; a means connected to each of said annular members to hold said members rotationally immobile during co-rotation of said pipe and said wheels; an elongated drive shaft; a plurality of spaced apart supports affixed to said string of pipe to rotationally support said drive shaft along said string of pipe for planetary movement, while rotating, around said string of pipe; and a plurality of drive means, each of which is drivingly interconnected between one of said annular members and said drive shaft is react on said rotationally immobile annular members to translate rotation of said drive shaft into rotation of said string of pipe and said wheels and into planetary revolution of said drive shaft, whereby said apparatus is moved, some of said drive means having a predetermined degree of lost motion before reacting on said rotationally immobile annular member.

9. Irrigation apparatus as set forth in claim 8 in which each of said drive means includes a rotatable member adapted for planetary movement around the axis of said annular member and a means drivingly interconnecting said annular member and rotatable member in direct driving relationship, said rotatable member, in some of said drive means, having a means coming into direct driving relationship with said drive shaft after a predetermined degree of angular movement of said drive shaft.

10. Irrigation apparatus as set forth in claim 8 in which each of said drive means includes a ring gear formed on said annular member and a pinion drivingly engaged with said ring gear for planetary movement around the axis of said ring gear, and a gear train in direct driving relation to said drive shaft, said gear train having a predetermined degree of lost motion before drivingly engaging said pinion.

11. Irrigation apparatus as set forth in claim 10 in which said pinion is keyed to a rotatable shaft that rotatably mounts a gear of said gear train, said gear having a crank pin affixed thereto and said shaft having a radially outwardly extending arm keyed thereto whose outer end intercepts the path followed by said crank pin when said gear is actuated by said gear train whereby said arm is drivably engaged by said crank pin to rotate said shaft and pinion.

12. Irrigation apparatus comprising: a pipe; a plurality of coaxial spaced apart wheels coaxially drivingly affixed to said pipe to rollingly support said pipe; a support means rigidly affixed to and extending radially outwardly from said pipe; a ring gear rotatably mounted on said support means coaxially with said pipe; a means connected to said ring gear to hold said ring gear rotationally immobile during co-rotation of said pipe, said wheels and said support means; a rotatable pinion carried on said support means in driving engagement with said ring gear; and means to rotate said pinion to urge said pinion into planetary movement around the axis of said rotationally immobile ring gear whereby said support means, said pipe and said wheels are rotated.

13. Irrigation apparatus as set forth in claim 12 in which said means to rotate said pinion includes a rotatable drive shaft carried on said support means and, also, is adapted for direct driving relation of said drive shaft with said pinion only after a predetermined degree of rotation of said drive shaft.

14. Irrigation apparatus as set forth in claim 12 in which said means to rotate said pinion includes a gear train having a drive shaft and in which said pinion is keyed to a rotatable shaft that rotatably mounts a gear of said gear train, said gear having a crank pin affixed thereto and said rotatable shaft having a radially outwardly extending arm keyed thereto whose outer end intercepts the path of said crank pin to be drivably engaged by said crank pin after a predetermined degree of rotation of said drive shaft.

15. In combination: a rotatable member; a rotatable shaft; means mounting said shaft for planetary revolution, while rotating, around said member when said member rotates; a power source gravitationally pendent from the rotational axis of said member; and means to drivingly interconnect said power source and shaft throughout planetary revolution of said shaft.

16. A power source for an irrigation apparatus comprising: a mounting shaft; means to support said shaft coaxially with an irrigation pipe and for co-rotation with said pipe and having a rotatable drive shaft positioned for planetary movement about the axis of said mounting shaft when said pipe is rotated; a prime mover; means rotatably mounted on said mounting shaft to support said prime mover in gravitationally pendent position; and means to drivingly interconnect said prime mover and said drive shaft throughout planetary revolution of said drive shaft.

17. A power source as set forth in claim 16 in which said means to drivingly interconnect said prime mover and said drive shaft includes a means for reversing the direction of rotation of said drive shaft.

18. A power source as set forth in claim 16 including a clutch for selective engagement and disengagement of said prime mover and said drive shaft, said clutch comprising a pair of telescopically related members in said means rotatably mounted on said mounting shaft for raising and lowering the axis of an output shaft of said prime mover whereby said output shaft can be raised and lowered out of and into driving engagement with said means to drivingly interconnect said prime mover and said drive shaft.

References Cited in the file of this patent
UNITED STATES PATENTS

| | | |
|---|---|---|
| 959,914 | Bevill | May 31, 1910 |
| 1,056,278 | Jeffery | Mar. 18, 1913 |
| 1,262,140 | Taylor | Apr. 9, 1918 |
| 1,665,332 | Timken | Apr. 10, 1928 |
| 1,776,412 | Bresien | Sept. 23, 1930 |
| 2,582,416 | Cornelius | Jan. 15, 1952 |
| 2,806,717 | Hempel | Sept. 17, 1957 |
| 2,892,466 | Stilwell | June 30, 1959 |
| 2,912,996 | Moulton | Nov. 17, 1959 |
| 2,916,306 | Rickard | Dec. 8, 1959 |
| 2,940,672 | Gaskell | June 14, 1960 |

UNITED STATES PATENT OFFICE
CERTIFICATE OF CORRECTION

Patent No. 3,147,764            September 8, 1964

Arthur E. Jensen

It is hereby certified that error appears in the above numbered patent requiring correction and that the said Letters Patent should read as corrected below.

Column 10, line 36, for "supporters" read -- supports --; line 52, after "arranged" insert -- to --; line 69, for "is" read -- to --.

Signed and sealed this 12th day of January 1965.

(SEAL)
Attest:

ERNEST W. SWIDER
Attesting Officer

EDWARD J. BRENNER
Commissioner of Patents